July 15, 1941.    T. B. DRESCHER    2,249,121
APPARATUS FOR SETTING MACHINE TOOLS
Filed Dec. 2, 1939
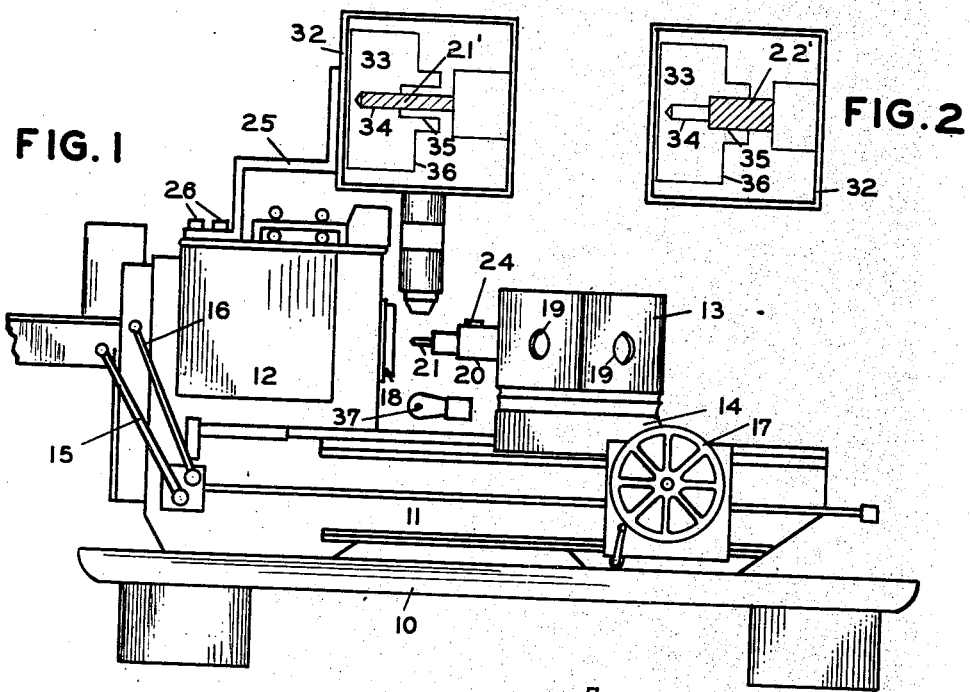
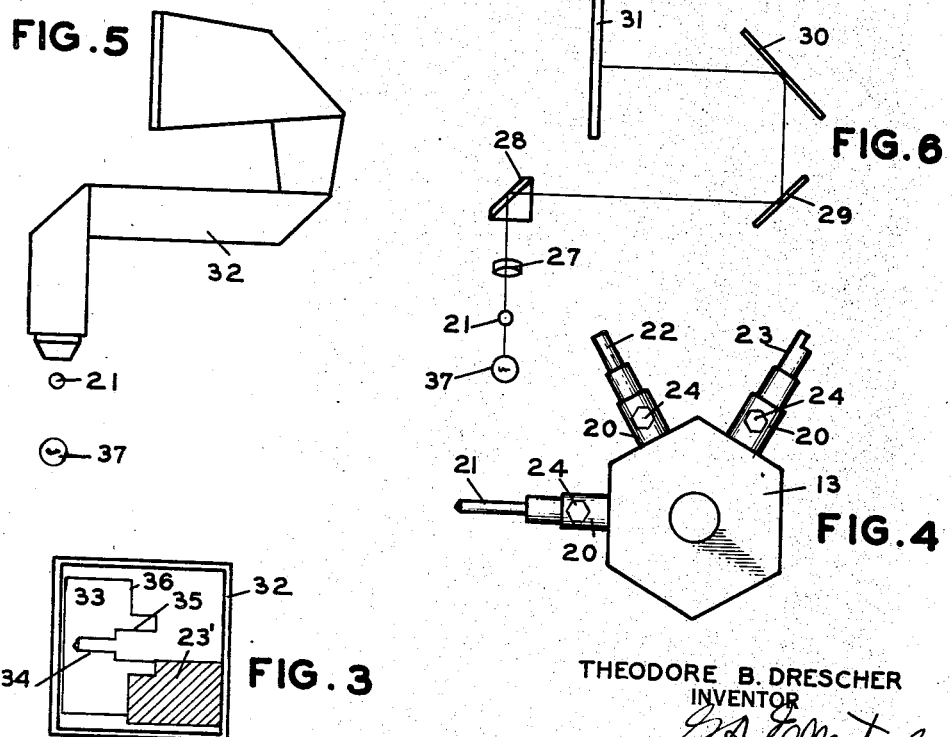
THEODORE B. DRESCHER
INVENTOR
BY
ATTORNEYS Patented July 15, 1941

2,249,121

UNITED STATES PATENT OFFICE 2,249,121

APPARATUS FOR SETTING MACHINE TOOLS

Theodore B. Drescher, Brighton, N. Y., assignor to Bausch & Lomb Optical Company, Rochester, N. Y., a corporation of New York Application December 2, 1939, Serial No. 307,296

4 Claims. (Cl. 29—57)

The present invention relates to an apparatus for accurately positioning or checking the position of a forming tool relative to a work piece.

Machine tools such as turret lathes, screw machines or the like, are usually set up by crude cut and try methods. The various tools are set in their approximate positions and a piece is cut. This work piece is then measured and, unless cuts are all correct, the tools are reset. The process is then repeated again and again until the work piece is cut to proper form. These repeated set-ups and cuts not only consume a great deal of time but result in a considerable waste of material.

It is an object of the present invention to avoid this laborious and expensive method of setting up and to provide an apparatus by which tools may be positioned accurately relative to the work piece. Another object is to provide an apparatus in which an enlarged image of a tool is projected on a surface carrying an enlarged outline of the finished work piece. A further object is to provide an apparatus for checking the contour, size and position of a cutting tool relative to the contour, size and position of the piece to be cut. These and other objects and advantages reside in certain novel features of construction, arrangement and combination of parts as will hereinafter be more fully set forth and pointed out in the appended claims.

In the drawing:

Fig. 1 is an elevation of a turret lathe having my new tool positioning apparatus.

Figs. 2 and 3 are elevations of the screen showing different tool positions.

Fig. 4 is a plan view of the lathe turret.

Fig. 5 is a side elevation of the projection system.

Fig. 6 is a diagrammatic view of the projection optical system.

The positioning and checking of the tools of a turret lathe constitute an important application of my invention and it is in connection with such a machine that my invention is illustrated. The actual structure of the turret lathe forms no part of the invention and hence the construction of the lathe is not shown in detail.

The lathe illustrated in the drawing consists of a table or support 10 upon which is mounted the lathe bed 11. The lathe head 12 is mounted at one end of the bed 11 and the turret 13 is rotatably mounted on a carriage 14 which moves toward and from the head 12 along the bed 11. The usual control levers 15 and 16 regulate the speed and direction of rotation, and a hand wheel 17 serves to position the carriage 14 and turret 13 along the lathe bed 11.

The work piece, not shown, is held in a chuck 18 rotatably carried by the head 12. The turret 13 is hexagonal and each face has an opening 19 for receiving a tool holder 20. Various tools 21, 22 and 23 for performing various operations are adjustably secured in the tool holders 20 by bolts 24.

In operation, the carriage 14 moves along the bed 11 to bring a tool, for example, the drill 21, into cutting relation to a work piece in the chuck 18. When this tool has completed its work, the carriage 14 moves back away from the work piece, the turret 13 revolves to bring another tool, for example, the drill 22, into operative position and the carriage 14 again moves forward toward the work piece. The construction and operation of these turret lathes is well known to persons skilled in the art.

According to the present invention a projection apparatus is suitably mounted above the locus of the work piece. This apparatus may be mounted on a bracket 25 secured to the lathe head 12 by bolts 26 or it may be mounted independently of the lathe. One projection system which is satisfactory in practicing my invention is that illustrated in U. S. Patent 1,934,582 issued November 7, 1933, to E. Bausch et al. for Projection apparatus. This projection system consists of an objective lens 27, a right angle roof prism 28, two plane reflectors 29 and 30 and a projection screen 31. All of these elements, I prefer to mount in a suitable housing 32 and the housing 32 may be secured to the bracket 25 or other support. In this projection system, the lens 27 is preferably of a predetermined focal length and the optical distance from the lens 27 to the projection screen 31 is preferably predetermined and fixed. When these conditions are met, an image formed by the lens 27 on the screen 31 will have a fixed and predetermined magnification.

A drawing or template 33 of the piece to be cut is made on a scale equal to the magnification of the projection system. Thus, if the magnification of the projection system is 10x, the drawing or template is made on a 10x scale. This drawing or template 33 is then suitably secured on the screen 31. In the example shown in the drawing, the work piece is to be cut with a large central hole 35 and a smaller hole 34 extending into the piece from the bottom of the hole 35. The end of the piece is to be squared off around the hole 35 and the outside of the piece cut back to a shoulder 36. It is to be understood that this particular shape is given merely by way of example and that my invention can be used for any desired shape of finished piece.

The projector is mounted so that the position of the screen 31 and drawing or template 33 is conjugate to the locus of the work piece. The carriage 14 is then moved forward until the tool 21 is in cutting position and an image 21' of the tool is formed on the screen 31. The operator can then compare the contour, size and position of the tool to the contour, size and position of the cut to be made at any desired magnification. If the tool is of the wrong size or contour, it is removed and reground but its position can be adjusted to suit the template or drawing 33 by loosening the bolt 24 and adjusting the tool in the holder 20.

When the images 21', 22' and 23' correspond to the drawing or template 33 as shown in Figs. 1, 2 and 3, the tools 21, 22 and 23 are in proper position to cut the proper surfaces on the work piece. Thus the first piece cut is absolutely accurate, no measuring or resetting is necessary and spoiled test pieces are eliminated.

As illustrated, the template or drawing 33 has the form and size of the finished piece but it can, of course, take other forms. Two scales at right angles on the screen would be sufficient to check the contour, size and location of the tool.

In order to form a clear and distinct image, it will probably be necessary to use a suitable source of light 37. This light source 37 may be above or below the tool and causes a sharp image of the tool to be formed on the screen.

From the foregoing, it will be apparent that I am able to attain the objects of my invention and provide a new and improved apparatus for checking the size, contour and position of machine tools. While I have illustrated my invention in connection with a turret lathe, obviously it is applicable to a variety of machines and to abrading as well as cutting tools. Various modifications of structure can also be made without departing from the spirit of my invention or the scope of the appended claims.

I claim:

1. In a cutting machine of the type having means for supporting a work piece, means for supporting a cutting tool and means for moving the cutting tool into cutting relation with the work piece, an apparatus for checking the size, position and contour of the tool prior to supporting a work piece for a cutting operation, comprising, a projection screen adjacent to the machine, means carried by said screen for representing in profile at a predetermined magnification the size and the contour to which the work piece is to be cut, an objective lens for forming an image of said tool on said screen in a position with respect to said profile which corresponds to the position assumed by the tool with respect to a work piece carried by the supporting means therefor at the completion of a cutting operation, said lens forming said image at the predetermined magnification of the profile, and means for supporting the objective lens between the tool and the screen.

2. An apparatus for checking the size, position and contour of a cutting tool of a machine of the type having a support for a work piece and means for supporting a cutting tool in cutting relation with the work piece, the checking of the tool being made prior to supporting the tool for a cutting operation and with the tool in a position corresponding to that which it would assume with respect to a work piece at the completion of its cutting operation, said apparatus comprising an objective lens, means for supporting the objective lens adjacent said tool and with its object plane substantially at the locus of a work piece, a template, and means for supporting the template in the focal plane of the lens conjugate to the locus of said work piece, said template being shaped in the form to be cut on said work piece and being of a size equal to the size of said work piece times the magnification of the objective lens.

3. In a cutting machine of the type having means for supporting a work piece, means for supporting a cutting tool and means for moving the cutting tool into cutting relation with the work piece, an apparatus for checking the size, position and contour of the tool prior to supporting a work piece for a cutting operation comprising, a projection screen adjacent to the machine, means carried by said screen for representing in profile at a predetermined magnification the size and the contour to which the work piece is to be cut, an objective lens for forming an image of said tool on said screen in a position with respect to said profile which corresponds to the position assumed by the tool with respect to a work piece carried by the supporting means therefor at the completion of a cutting operation, said lens forming said image at the predetermined magnification of the profile and being mounted between the locus of the work piece and the screen so that the locus of the work piece and the screen are at conjugate foci of the lens, the supporting means for the tool being also provided with adjustable means whereby a supported tool may be repositioned in the support to cause its image to coincide with said profile.

4. An apparatus to assist in the setting of a cutting tool of a lathe in a position corresponding to that necessarily assumed by said tool at the completion of its cutting operation in making a desired cut, the lathe having a work holder and a movable tool holder adjustably supporting a cutting tool, said apparatus comprising a projection system having an objective lens, a projection screen in fixed spaced relation to the lens, optical means between said lens and screen for inverting and reverting an image formed by said lens, means for supporting the projection system adjacent said lathe so that said work holder is in the object plane of the lens, an outline drawing of the work piece to be cut, means for securing the drawing on the screen, said drawing being made to a scale equal to the magnification of the projection system, and means for moving the tool into the object plane of said lens whereby a magnified image of the tool is formed on the screen adjacent said drawing of the work piece and in a position which corresponds to that actually assumed by the tool with respect to the work piece on the completion of its cutting operation for the particular setting of the tool in its holder.

THEODORE B. DRESCHER.